United States Patent
Figueredo de Santana et al.

(10) Patent No.: US 12,381,923 B2
(45) Date of Patent: Aug. 5, 2025

(54) COORDINATING KNOWLEDGE FROM VISUAL COLLABORATION ELEMENTS

(71) Applicant: INTERNATIONAL BUSINESS MACHINES CORPORATION, Armonk, NY (US)

(72) Inventors: Vagner Figueredo de Santana, São Paulo (BR); Ana Fucs, Rio de Janeiro (BR); Renato Fontoura de Gusmao Cerqueira, Rio de Janeiro (BR); Vinicius Costa Villas Boas Segura, Rio de Janeiro (BR); Viviane Torres Da Silva, Laranjeiras (BR); Raquel Zarattini Chebabi, Campinas (BR)

(*) Notice: Subject to any disclaimer, the term of this patent is extended or adjusted under 35 U.S.C. 154(b) by 0 days.

(21) Appl. No.: 17/807,901

(22) Filed: Jun. 21, 2022

(65) Prior Publication Data
US 2023/0412654 A1    Dec. 21, 2023

(51) Int. Cl.
*H04L 65/403* (2022.01)
*G06F 40/20* (2020.01)

(52) U.S. Cl.
CPC ............ *H04L 65/403* (2013.01); *G06F 40/20* (2020.01)

(58) Field of Classification Search
CPC ....... H04L 65/403; G06F 40/20; G06F 40/279
See application file for complete search history.

(56) References Cited

U.S. PATENT DOCUMENTS

| | | | |
|---|---|---|---|
| 8,103,962 B2 | 1/2012 | Embley | |
| 8,601,023 B2 | 12/2013 | Brave | |
| 8,620,964 B2 | 12/2013 | Tsatsou | |
| 9,582,574 B2 * | 2/2017 | Cardonha | G06F 16/38 |
| 9,842,102 B2 | 12/2017 | Salome | |
| 9,965,160 B2 | 5/2018 | Yelsey | |
| 10,049,162 B2 | 8/2018 | Estes | |
| 10,157,212 B2 | 12/2018 | White | |
| 10,496,683 B2 | 12/2019 | Franceschini | |

(Continued)

FOREIGN PATENT DOCUMENTS

| | | |
|---|---|---|
| CN | 112149004 A | 12/2020 |
| CN | 113158033 A | 7/2021 |
| WO | WO-2021092099 A1 * | 5/2021 |

OTHER PUBLICATIONS

Ceccaroni et al., "A graphical environment for ontology development", https://dl.acm.org/doi/abs/10.1145/860575.860744, ACM, AAMAS, Jul. 2003, pp. 958-959.

(Continued)

*Primary Examiner* — Schquita D Goodwin

(57) ABSTRACT

A computer-implemented method, a computer system and a computer program product coordinates knowledge from visual elements in a collaboration session. The method includes obtaining collaboration session data. The collaboration session data includes a plurality of visual elements and a plurality of participant interactions. The method also includes identifying a subject and a link in the plurality of visual elements using a text recognition algorithm. In addition, the method includes applying a weight to the link based on the plurality of participant interactions and a distinct characteristic in the plurality of visual elements. Lastly, the method includes generating a knowledge graph. The nodes of the graph comprise the subjects and the edges of the graph comprise weighted links.

17 Claims, 4 Drawing Sheets

(56) References Cited

U.S. PATENT DOCUMENTS

| | | | |
|---|---|---|---|
| 10,540,383 | B2 | 1/2020 | Cobbett |
| 10,572,521 | B2 | 2/2020 | Franceschini |
| 2008/0228812 | A1 | 9/2008 | Oglesby |
| 2015/0142888 | A1* | 5/2015 | Browning ............... G06F 40/30 709/204 |
| 2017/0061302 | A1 | 3/2017 | Subasi |
| 2017/0124158 | A1 | 5/2017 | Mirhaji |
| 2019/0034520 | A1* | 1/2019 | Jalagam ................ G06F 16/27 |
| 2019/0087767 | A1* | 3/2019 | Lu ...................... G06F 21/6218 |
| 2020/0065343 | A1* | 2/2020 | Morkovine ........... G06Q 10/10 |
| 2020/0065379 | A1* | 2/2020 | Shires ................... G10L 21/10 |
| 2020/0084519 | A1* | 3/2020 | Pappu ................. H04N 21/8405 |
| 2020/0389506 | A1* | 12/2020 | Rakshit .............. H04L 65/1083 |
| 2021/0012065 | A1* | 1/2021 | Shmuel ................ G06F 40/35 |
| 2021/0311612 | A1 | 10/2021 | Lemanowicz |
| 2022/0103603 | A1* | 3/2022 | Vendrow ................ G06F 40/30 |
| 2022/0263877 | A1* | 8/2022 | Conlin ............... H04L 65/4015 |
| 2023/0164095 | A1* | 5/2023 | Ramanathan .......... G06N 3/044 709/206 |

OTHER PUBLICATIONS

Cepeda et al., "Knowledge extraction from pointer movements and its application to detect uncertainty", https://www.sciencedirect.com/science/article/pii/S2405844020327158, ScienceDirect, Heliyon, vol. 7, Issue 1, Jan. 2021, pp. 1-39.

Elnagar et al., "An Automatic Ontology Generation Framework with an Organizational Perspective", https://aisel.aisnet.org/hicss-53/ks/knowledge_flows/3/, Proceedings of the 53rd Hawaii International Conference on System Sciences, 2020, pp. 4860-4869.

Fang et al., "Folksonomy-Based Visual Ontology Construction and Its Applications", https://ieeexplore.ieee.org/abstract/document/7403978, IEEE Transactions on Multimedia, vol. 18, No. 4, Apr. 2016, pp. 702-713.

Jiang et al., "Visual Ontology Construction for Digitized Art Image Retrieval", https://link.springer.com/article/10.1007/s11390-005-0855-x, J. Comput. Sci. & Technol., vol. 20, No. 6, Nov. 2005, pp. 855-860.

Kumar et al., "Automated ontology generation from a plain text using statistical and NLP techniques", https://link.springer.com/article/10.1007/s13198-015-0403-1, Springer, Int J Syst Assur Eng Manag, Dec. 2016, 7(Suppl. 1), pp. S282-S293.

Lonsdale et al., "Reusing ontologies and language components for ontology generation", https://www.sciencedirect.com/science/article/abs/pii/S0169023X09001153, ScienceDirect, vol. 69, Issue 4, Apr. 2010, pp. 1-5.

Mell et al., "The NIST Definition of Cloud Computing", National Institute of Standards and Technology, Special Publication 800-145, Sep. 2011, pp. 1-7.

Park et al., "Product Ontology Construction from Engineering Documents", https://ieeexplore.ieee.org/abstract/document/4505663, IEEE, International Conference on Smart Manufacturing Application, Apr. 2008, pp. 305-310.

Wachter et al., "Semi-automated ontology generation within OBO-Edit", https://academic.oup.com/bioinformatics/article/26/12/188/283065, Bioinformatics, vol. 26, ISMB, 2010, pp. i88-i96.

* cited by examiner

COORDINATING KNOWLEDGE FROM VISUAL COLLABORATION ELEMENTS

BACKGROUND

Embodiments relate generally to the field of automatic ontology generation, and in particular to coordinating knowledge from visual elements in a collaboration session while prioritizing based on participant interactions.

It may be common for people in professional or personal environments to transfer knowledge and collaborate on projects through collaboration sessions. While in-person sessions may be preferred, newer software applications, such as visual collaboration tools, may increase the value of virtual collaboration sessions. Users in the virtual collaboration session may interact or present information to the group using graphics or other visual methods that may form the basis for a knowledge domain that may be defined using an ontology, which may in turn be used for a knowledge graph or other representation of the domain.

SUMMARY

An embodiment is directed to a computer-implemented method for coordinating knowledge from visual elements in a collaboration session. The method may include obtaining collaboration session data, where the collaboration session data may includes a plurality of visual elements and a plurality of participant interactions. The method may also include identifying a subject and a link in the plurality of visual elements using a text recognition algorithm. The method may further include applying a weight to the link based on the plurality of participant interactions and a distinct characteristic in the plurality of visual elements. Lastly, the method may include generating a knowledge graph, where nodes of the graph comprise the subjects and edges of the graph comprise weighted links.

In another embodiment, the method may include creating a graphic visualization of the knowledge graph, where the graphic visualization includes one or more portions of the knowledge graph. In this embodiment, the method may also include displaying the graphic visualization on a device.

In a further embodiment, applying the weight to the link may also include applying a rank to the subject based on the plurality of participant interactions and the distinct characteristic in the plurality of visual elements.

In yet another embodiment, the method may include identifying a participant for each of the plurality of participant interactions in the collaboration session data and associating the participant with a participant interaction and an identified subject. In this embodiment, the method may also include determining that the participant is skilled in the identified subject from a participant profile obtained from a database. Lastly, in this embodiment, the method may include modifying the weight of the link based on the participant interaction.

In another embodiment, the distinct characteristic in the plurality of visual elements may be selected from a list consisting of: a color of a visual element, a proximity of the visual element to other visual elements, an alignment of the plurality of visual elements and a determination that the visual element overlaps other visual elements in the plurality of visual elements.

In a further embodiment, the participant interactions may be selected from a list consisting of: mouse movements of the participant in the collaboration session, mouse clicks of the participant in the collaboration session, physical movements of a visual element by the participant and a number of participants that interact with the visual element.

In yet another embodiment, applying the weight to the link may also include using a machine learning model that predicts a priority of a topic by detecting a participant sentiment in statements by the participant.

In addition to a computer-implemented method, additional embodiments are directed to a system and a computer program product for coordinating knowledge from visual elements in a collaboration session.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

As remote work and global collaboration grow, the use of collaboration tools such as video conferencing and virtual collaboration sessions may become more prevalent. Many of these collaboration tools may include a visual component, where participants may create and manipulate graphics to transfer knowledge among the participants. In order to capture and distribute the knowledge and visual information from a project that may be represented by one or more collaboration sessions, an ontology may be created that could be subsequently used for a knowledge graph that includes a visualization of the subjects that may be discussed in the collaboration sessions, as well as links between the subjects that may indicate how the subjects may be related, including weights that may indicate importance. Ontology may refer to a formal naming and definition of the types, properties, and interrelationships of the subjects that exist for a particular domain. Creation of an ontology may normally require that human experts compile and review the data that makes up the ontology, which adds difficulty and expense to the process. The use of a visual tool in the collaboration process may add further difficulty and expense with a requirement to capture the visual elements and coordinate the visual elements with user interactions to determine the subjects of an ontology and how the subjects interrelate. Current schemes to automatically generate ontologies, and subsequent knowledge graphs, may be unable to manage the requirements that are posed by visual collaboration tools.

Therefore, it may be advantageous to provide a method for coordinating knowledge from visual elements in a collaboration session that may identify subjects from textual elements that may be present in a visual collaboration tool and prioritize the identified subjects through user interaction, such as an understanding for how the visual elements containing subjects may be manipulated in the visual collaboration tool, or through visual characteristics, such as how visual elements are arranged in the tool or perhaps a color or text font that may be used to represent the subject. There may also be an understanding of the sentiment of participants in virtual collaboration sessions using visual collaboration tools, including an understanding of participant skills and expertise through an analysis of a participant profile. Such a method may improve computer technology by enhancing visual collaboration tools through an ability to digitize results and quicken processes related to projects discussed in virtual collaboration sessions. This improvement may increase efficiency of project teams and software tools that use visual elements, as well as reduce the burden on designers, developers and knowledge engineers by bridging an existing gap between the processing of visual elements and generating a knowledge graph based on the visual elements.

Figure 1:
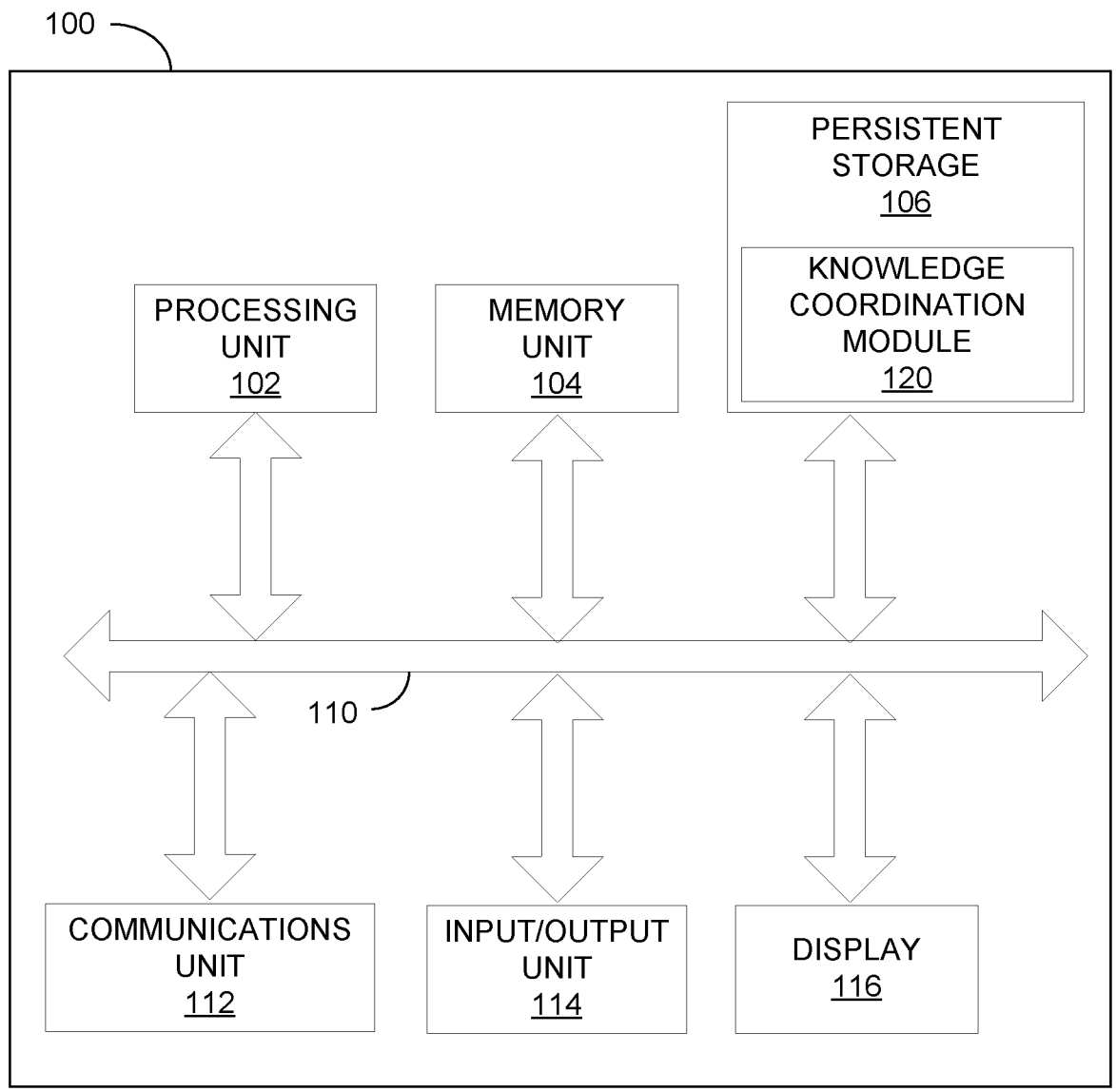
FIG. 1 depicts a block diagram of an example computer system in which various embodiments may be implemented.

Referring now to FIG. 1, there is shown a block diagram illustrating a computer system 100 in accordance with an embodiment. It should be appreciated that FIG. 1 provides only an illustration of one implementation and does not imply any limitations with regard to the environments in which different embodiments may be implemented. Many modifications to the depicted environments may be made based on design and implementation requirements. For example, computer system 100 may be implemented in hardware only, software only, or a combination of both hardware and software. Computer system 100 may have more or fewer components and modules than shown, may combine two or more of the components, or may have a different configuration or arrangement of the components. Computer system 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of computer system 100 may be co-located or distributed, or the system could run as one or more cloud computing "instances," "containers," and/or "virtual machines," as known in the art.

As shown, a computer system 100 includes a processor unit 102, a memory unit 104, a persistent storage 106, a communications unit 112, an input/output unit 114, a display 116, and a system bus 110. Computer programs such as the knowledge coordination module 120 may be stored in the persistent storage 106 until they are needed for execution, at which time the programs are brought into the memory unit 104 so that they can be directly accessed by the processor unit 102. The processor unit 102 selects a part of memory unit 104 to read and/or write by using an address that the processor unit 102 gives to memory unit 104 along with a request to read and/or write. Usually, the reading and interpretation of an encoded instruction at an address causes the processor unit 102 to fetch a subsequent instruction, either at a subsequent address or some other address. The processor unit 102, memory unit 104, persistent storage 106, communications unit 112, input/output unit 114, and display 116 all interface with each other through the system bus 110.

Examples of computing systems, environments, and/or configurations that may be represented by the computer system 100 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

It should be noted that computer system 100 may have a virtual collaboration session application loaded and running that may be configured to communicate with other computer systems using a computer network that may also have the virtual collaboration session application loaded and running. As a result, the knowledge coordination module 120 may operate in tandem with the virtual collaboration session application. The module may be discrete software that is separately loaded into the computing device or may be embedded within the virtual collaboration session application at the computing device. It will be appreciated by one of ordinary skill in the art that while the knowledge coordination module 120 may operate at a computing device, it is not required that the software is physically loaded or installed on the hardware but may be on a server for the virtual collaboration session. The same is true for the virtual collaboration session application itself as the virtual collaboration session may be fully in the cloud and hosted by a server that is not shown.

Each computer system 100 may also include a communications unit 112 such as TCP/IP adapter cards, wireless Wi-Fi interface cards, or 3G or 4G wireless interface cards or other wired or wireless communication links. Communication between mobile devices may be accomplished via a network and respective network adapters or communication units 112. In such an instance, the communication network may be any type of network configured to provide for data or any other type of electronic communication. For example, the network may include a local area network (LAN), a wide area network (WAN), a virtual private network (VPN), a mobile or cellular telephone network, the Internet, or any other electronic communication system. The network may use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computer system 100 may be used for coordinating knowledge from visual elements by recognizing subjects and links from text in the visual elements and prioritizing the recognized subjects and links based on an understanding of the context of virtual collaboration sessions that use the visual elements and the participants in the session. In particular, a knowledge coordination module 120 may be implemented within persistent storage 106 that may obtain data from a virtual collaboration session that may include visual elements, such as a chart or table, that contain text, as well as audio or video from the virtual collaboration session. The identity of the participants in the virtual collaboration session may also be determined, including information about the expertise of the participants. For instance, it may be determined that specific participants are highly skilled in certain topics that may be discussed, which may be used to weight the links between subjects in the process described below. Once the knowledge coordination module 120 has obtained data from the virtual collaboration session, the knowledge coordination module 120 may parse any text that may be present in the visual elements such that nouns that may be recognized using text recognition algorithms are subjects, or nodes in a potential knowledge graph, and action verbs that may also be recognized in the text are links between subjects, or edges in a potential knowledge graph. An incomplete draft knowledge graph may be created at this point, but further processing may refine this optional step.

The visual elements containing the text may be scanned over the course of the virtual collaboration session using object recognition, in the case of video from the session, or using interaction logs in the case of a visual collaboration tool that may be software loaded on a computer system. In either case, the configuration of the visual elements may indicate a priority that may be applied between two subjects, also implying a weight to a link between the two subjects or indicating a ranking for one subject with respect to another subject. For instance, if the visual elements are displayed in a hierarchical fashion, a visual element that may be displayed above another visual element may indicate a priority. In another example, two visual elements that may be displayed in separate charts may indicate that there is no relation between subjects. In addition to examining the interactions of the participants with the visual elements, the identity of the participants may also be determined from user profiles that may be connected to the virtual collaboration session and weights may be applied to the links based on which participant is interacting with which visual element. For instance, if a participant has been identified with a specific expertise related to a subject, that participant's interaction with the specific subject may have more priority than another participant's interactions. In addition, sentiment analysis with an appropriate machine learning model may be applied to statements made in a virtual collaboration session in connection with a specific visual element or subject that may also be used to weight links between subjects or rank the subjects themselves. Once the visual elements and related virtual collaboration session data is analyzed, the knowledge graph that may have been generated in the optional step above may be refined with the new information and a graphic visualization of the knowledge graph may be displayed, both of which may capture and coordinate the knowledge from the virtual collaboration session.

It is important to note that any monitoring and collection of personal data from a user as mentioned herein, including participant interaction data as described or specific user details from a profile, requires the informed consent of all those people whose data is captured for analysis. Consent may be obtained in real time or through a prior waiver or other process that informs a subject that their data may be captured by appropriate devices or other sensitive personal data may be gathered through any means and that this data may be analyzed by any of the many algorithms that may be implemented herein. A participant may opt out of any portion of the data collection and monitoring at any time.

Figure 2:
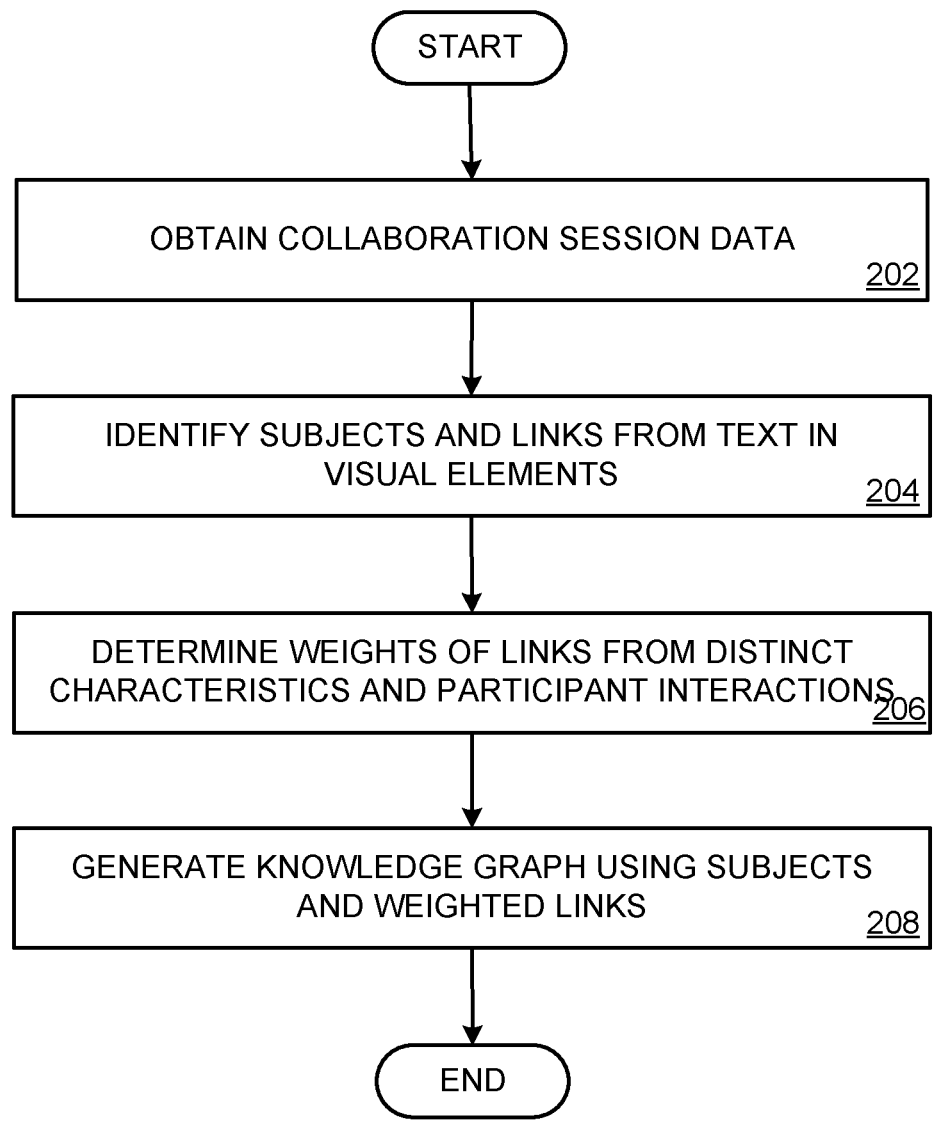
FIG. 2 depicts a flow chart diagram for a process to coordinate knowledge from visual elements in a collaboration session according to an embodiment.

Referring to FIG. 2, an operational flowchart illustrating a process 200 for coordinating knowledge from visual elements in a collaboration session is depicted according to at least one embodiment. At 202, data related to a virtual collaboration session may be obtained. This data may include real-time monitoring of the virtual collaboration, consisting of knowledge gathered from the virtual collaboration session and its participants. In an embodiment, the virtual collaboration session may be started and run through a virtual collaboration session application, but this is not required. A virtual collaboration session may be any forum that connects one or more participants to each other in a collaborative way, such that topics may be discussed, and audio and video may be transmitted to and received by all participants, along with the visual collaboration tools described herein. Examples of real-time monitoring may include gathering video of the participants from a camera and/or extracting images or capturing audio from a microphone. Other examples of real-time monitoring may be capturing contemporaneous chat conversations, either through a chat function embedded within the virtual collaboration session application or external to the virtual collaboration session software on participant computers or taking a screen shot of a participant's computer. One of ordinary skill in the art will recognize that the camera or microphone or other device may be present in the local environment of the participant, but audio or video may not be required to come directly from these devices. It is also not required that the devices that capture the virtual collaboration session connect directly to a device in the virtual collaboration session. Mobile devices that may be connected to the participants may also be used to capture the virtual collaboration session and text, e.g., SMS, conversations on mobile devices may also be scanned.

The virtual collaboration session data may also include stored information regarding the session and participants, which may be obtained from a server. It should be noted that it is not required for the stored information to be obtained at any specific time. The information may be obtained before the session or once the session has started. The data to be obtained may include a session agenda and topics or a collaboration session type such as a discussion or brainstorming session. In addition, obtaining virtual collaboration session data may take multiple forms. For instance, the invitation list for the virtual collaboration session may be scanned to identify the participants in the collaboration session or alternatively, any person who is actively connected to the session may be identified as a participant. It is not required that the virtual collaboration session data come from a specific source.

The virtual collaboration session information may also include detailed information about each participant such as a job role or expertise. This information may be put into a participant profile which may include details regarding the participant's relevance to the topic under discussion at the collaboration session. As an example, if the participant is identified as an expert in a field, then any subject with which the participant interacts may be ranked higher in priority or links from that subject may have a weight increased based on the determination. The information about the participant, as well as the entirety of the virtual collaboration session information, may be stored in a database for use in the knowledge coordination process and it is not required for a formal profile to be created.

At 204, a text recognition algorithm may be used with the visual elements in the virtual session collaboration data to identify subjects and links that may form the basis for an ontology or a knowledge graph based on the session. As part of identifying the text, the knowledge coordination module 120 may classify a chart that may be visible in a collaboration tool that may be connected to the virtual collaboration session based on type. One of ordinary skill in the art will recognize that many types of charts or tables may be used by participants to represent knowledge, e.g., a hierarchical structure such as a pyramid or any shape that may link subjects together. The concepts that may be linked in the visual element may be written on tabs of paper, if an image of a physical chart were being scanned, or else may be text boxes in the case of software running on a computer, e.g., computer system 100.

The text in the image or text boxes may be recognized and parsed with a natural language processing (NLP) algorithm with the aim of automatically identifying the main entities, i.e., the subjects, and the relationships between the entities, i.e., the links. The natural language processing algorithm may identify nouns in sentences in the recognized text and mark the nouns as potential subjects, or nodes in a knowledge graph. At the same time, action verbs in the same sentences may be marked as links. For instance, if the sentence "email addresses that continuously request access without a password are fraudulent" is recognized in the text of the visual element, subjects may include "email addresses", "access", "password" and "fraudulent" while potential links are "continuously request" and "are". The candidate subjects and links may be collected at this step and, optionally, the knowledge coordination module 120 may arrange the subjects and links into a draft knowledge graph, where the knowledge coordination module 120 may initially rank the subjects and apply weights to the links between the subjects simply based on the text that may be recognized and how the text may be arranged in the visual element. The graph that may be created at this step would be the starting point for the analysis of participant interactions with the text within the virtual collaboration session.

At 206, interactions that a participant may have with a visual element, along with an understanding of the skill or expertise of the participant, may be leverages to apply a weight to the links between subjects and also rank the individual subjects. The weights and ranks may be determined at this step, or if a draft knowledge graph has been created in a prior step with weights or ranks, those weights or ranks may be updates. One of ordinary skill in the art will recognize that interaction log files may be obtained as part of the collaboration session data above, but the logs and profiles may also be obtained separately. In addition, the interaction log files may take several forms. For instance, mouse movements of participants during a collaboration session may be tracked and recorded, as well as which visual elements are selected and moved by one or more participants. In the case of an in-person collaboration session, objects and participants may be recognized and movements tracked in video of the session, and in both in-person or virtual collaboration sessions, an interaction log may also indicate a number of participants interacting with specific visual elements.

The information extracted from the interaction logs may be used to weight the links between the subjects and also rank the subjects. For example, the movements of visual elements within a chart in a collaboration tool may indicate a relationship between multiple visual elements that may have been identified as subjects because the visual elements are being moved together. In another case, subsequent movements of visual elements from one position to another may indicate that the participant has some doubt about a specific relationship. As more participants interact with a certain visual element by editing or positioning a specific visual element, the weight of a link between subjects or the rank of a specific subject may be increased, in relation to an increase of both importance and certainty.

In addition to participant interactions, profiles of individual participants may be obtained, and the information may be used to further refine the applications of weights to links and ranking of subjects. The identification of the different profiles of the participants in a collaboration session may assist in understanding both the importance of specific subjects and also the relationship between recognized objects. For example, certain participants that are skilled in specific subjects may indicate a higher weight with respect to that participant's interactions with specific visual elements that may affect the weight or rank that should be applied. In an embodiment, the subjects and corresponding links may be clustered using an algorithm known in the art based on the participants' profiles, which may assist in both the identification of the subjects and links and also the application of weights to links and ranks of subjects and may embed participant knowledge or reputation while defining a certain entity, e.g., subject or link.

It should be noted that the recognition of importance may apply both to identification of subjects and links in 204, as well as the application of weights to link or ranking of subjects. Another aspect that may be obtained from the collaboration session data may be any distinct characteristic of the recognized visual elements. For instance, a color that may be used for a visual element may indicate importance. Other example characteristics may be the alignment of visual elements in a chart or proximity of one visual elements to another, including whether or not individual visual elements overlap one another. This list, while not exhaustive, may include distinct visual characteristic that may be indicators of the importance of specific subjects or a relationship between multiple elements, which is information that may be used both to identify a subject or link and to apply a weight to a link between subjects or a rank to an individual subject. the relationship among graph elements (post-its).

In an embodiment, a supervised machine learning model may be trained to determine the importance of visual elements that may be recognized in the collaboration session data and also predict a weight of a link, or rank of a subject, using the participant interaction data in tandem with the visual elements. One or more of the following machine learning algorithms may be used: logistic regression, naive Bayes, support vector machines, deep neural networks, random forest, decision tree, gradient-boosted tree, multi-layer perceptron, and one-vs-rest. In an embodiment, an ensemble machine learning technique may be employed that uses multiple machine learning algorithms together to assure better prediction when compared with the prediction of a single machine learning algorithm. In this embodiment, training data for the model may include any of the types of collaboration session data, e.g., prior collaboration sessions that may have included specific participants or similar topics, along with video and audio and other communications from the participants. The training data may be captured from individual participants or a project group of multiple participants, with consent of any involved participants required prior to any data capture. The results of the training process may be stored in a database so that the data may be most current, and the output would always be up to date.

This step may optionally include an analysis of the sentiment of a participant in communications surrounding the collaboration session. A text message or video data or audio data that may include the participant may be collected and used to train a machine learning model that may predict sentiment of a participant based on statements that are made in the participant's communication. This predicted sentiment may indicate either the importance or certainty of the participant in their interactions with the topics in the collaboration session, and therefore may also affect the application of a weight to a link between subjects or a rank to a specific subject.

At 208, a knowledge graph may be automatically generated from the information that has been recognized from the collaboration session and applying the weights to links, along with the ranking of subjects. One of ordinary skill in the art would recognize a knowledge graph as using nodes and edges between nodes, where the edges also indicate a weight as to which edges are favored in traversing the graph. In this case, the nodes of the graph would map to the recognized subjects and the edges of the graph would map to the weighted links, where the weights that may be used in the graph may be adjusted by the rank that may have been applied to a specific subject. As part of this step, the knowledge graph may be optionally displayed on a device so that the graph may be reviewed by participants or any user that may have an interest in the ontology that was extracted from the collaboration session. This display may include a graphic visualization that may include notations that may be added to the graph on the screen and may also include either an entire graph or one or more portions of the graph to facilitate further review or processing of the information generated in the process 200. For instance, the information may need to be taken to a subject matter expert (SME) who is not a participant for further definition of entities that may be included in the knowledge graph or need approval to be added to the ontology.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
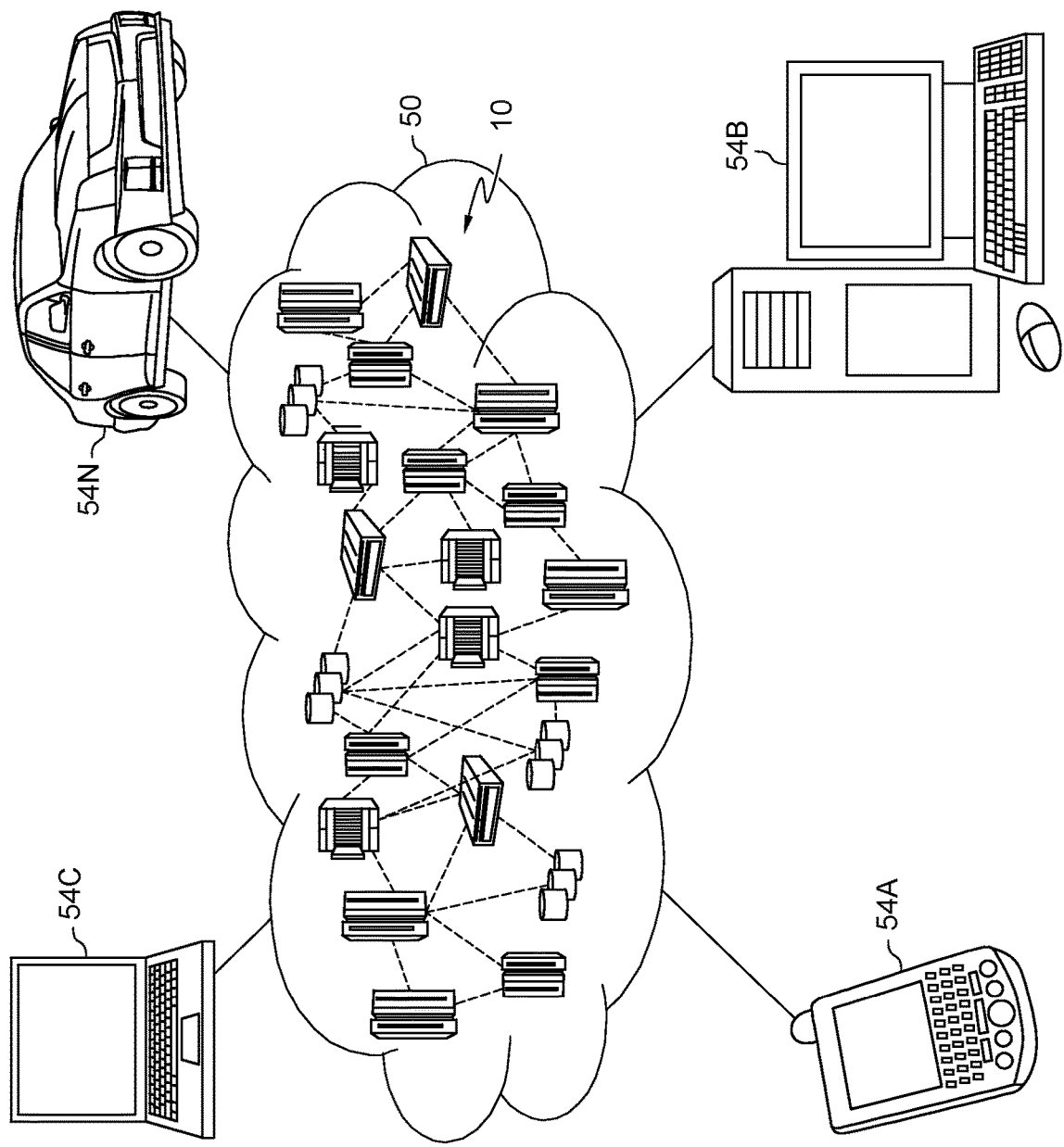
FIG. 3 depicts a cloud computing environment according to an embodiment.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
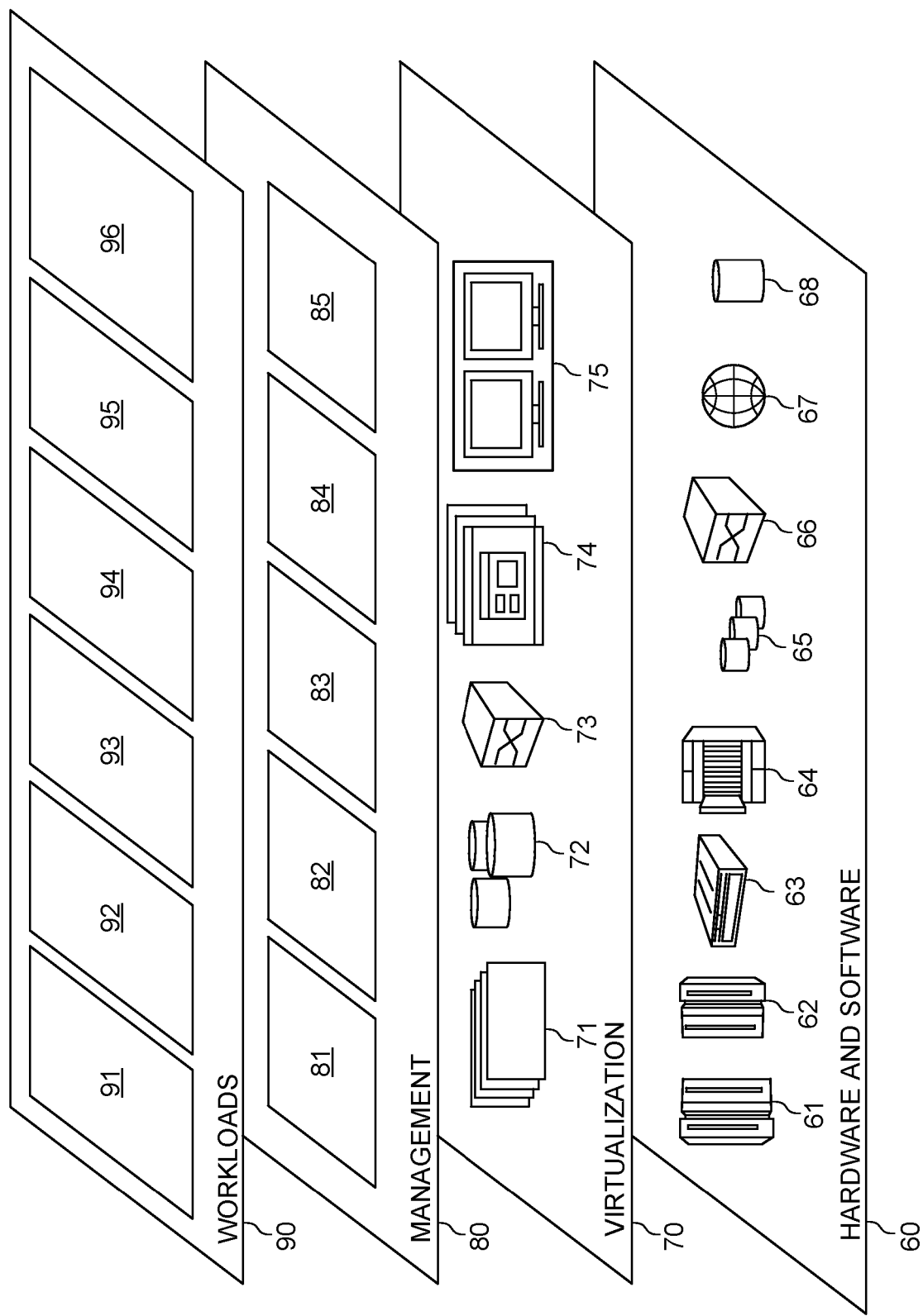
FIG. 4 depicts abstraction model layers according to an embodiment.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and coordination of knowledge from visual elements 96. Coordination of knowledge from visual elements 96 may refer to identifying subjects from text in an image related to personal or professional collaboration and prioritizing the subjects and links between the subjects to form a knowledge graph or other visualization of the knowledge.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for coordinating knowledge from visual elements in a collaboration session, the computer-implemented method comprising:
   obtaining collaboration session data from the collaboration session and a profile of one or more session participants, wherein collaboration session include provisioning one or more resources as needed across a distributive computing system;
   determining one or more visual elements appearing in said collaboration session and at least one visual element being moved by at least one session participant during said collaboration session;
   determining when a collaboration session is currently in progress and obtaining additional information from the one or more session participants;
   identifying a subject and a link in an image of the at least one session participant and the visual element by recognizing text with the visual element;
   recognizing a distinct characteristic of a displayed visual element and a movement of the visual element by the session participant in the image of the session participant and the visual element;
   obtaining subjects and links based on a context of the visual collaboration session as well as audio and video from the collaboration session from objects;
   identifying the session participant in the image of the at least one session participant and the visual element and determining an expertise of the at least one session participant based on the profile of the session participant;
   generating a knowledge graph using a knowledge coordination module to optimize resource use by leveraging metering capability appropriate to a type of service, wherein the knowledge graph comprises the subject as a node and the link as an edge and the link is weighted according to the distinct characteristic of the visual element and according to optimization of resources;
   determining the movement of the visual element by the session participant, and the expertise of the session participant where the edges indicate a weight as to which edges are favored in traversing the knowledge graph to further update the knowledge graph; and
   said knowledge coordination module updates the knowledge graph by incorporating the level of expertise of participants and further parsing any text present in the visual elements including nouns and verbs to further modify the knowledge graph using recognition algorithms to enhance a plurality of links between subjects, and the edges in the knowledge graph, wherein one or more recognized subjects and the edges of the knowledge graph are mapped to the plurality of links, and the links are weighted to be adjusted by ranking as applied to a specific subject.

2. The computer-implemented method of claim 1, further comprising:
   creating a graphic visualization of the knowledge graph, wherein the graphic visualization includes one or more portions of the knowledge graph and graphical notations associated with the knowledge graph; and
   displaying the graphic visualization of the knowledge graph on a device.

3. The computer-implemented method of claim 1, further comprising applying a rank to the subject based on the distinct characteristic of the visual element.

4. The computer-implemented method of claim 1, wherein the distinct characteristic of the visual element is selected from a list consisting of: a color of the visual element, a proximity of the visual element to other visual elements in the image, an alignment of visual elements in the image and a determination that the visual element overlaps the other visual elements.

5. The computer-implemented method of claim 1, wherein the participant interaction movement of the visual element by the at least one session participant in the image is selected from a list consisting of: mouse movements of the at least one session participant in the collaboration session, mouse clicks of the at least one session participant in the collaboration session, physical movements of the visual element by the at least one session participant and a number of session participants that interact with the visual element in the image.

6. The computer-implemented method of claim 1, wherein a machine learning model that predicts a priority of the subject by detecting a participant sentiment in statements by the at least one session participants is used to update a weight for the link in the knowledge graph.

7. A computer system for coordinating knowledge from visual elements in a collaboration session, the computer system comprising:
  one or more processors, one or more computer-readable memories, one or more computer-readable storage media, and program instructions stored on at least one of the one or more computer-readable storage media for execution by at least one of the one or more processors via at least one of the one or more computer-readable memories, wherein the computer system is capable of performing a method comprising:
  obtaining collaboration session data from the collaboration session and a profile of one or more session participants, wherein collaboration session include provisioning one or more resources as needed across a distributive computing system;
  determining one or more visual elements appearing in said collaboration session and at least one visual element being moved by at least one session participant during said collaboration session;
  determining when a collaboration session is currently in progress and obtaining additional information from the one or more session participants;
  identifying a subject and a link in an image of the at least one session participant and the visual element by recognizing text with the visual element;
  recognizing a distinct characteristic of a displayed visual element and a movement of the visual element by the session participant in the image of the session participant and the visual element;
  obtaining subjects and links based on a context of the visual collaboration session as well as audio and video from the collaboration session from objects;
  identifying the session participant in the image of the at least one session participant and the visual element and determining an expertise of the at least one session participant based on the profile of the session participant;
  generating a knowledge graph using a knowledge coordination module to optimize resource use by leveraging metering capability appropriate to a type of service, wherein the knowledge graph comprises the subject as a node and the link as an edge and the link is weighted according to the distinct characteristic of the visual element and according to optimization of resources;
  determining the movement of the visual element by the session participant, and the expertise of the session participant where the edges indicate a weight as to which edges are favored in traversing the knowledge graph to further update the knowledge graph; and
  said knowledge coordination module updates the knowledge graph by incorporating the level of expertise of participants and further parsing any text present in the visual elements including nouns and verbs to further modify the knowledge graph using recognition algorithms to enhance a plurality of links between subjects, and the edges in the knowledge graph, wherein one or more recognized subjects and the edges of the knowledge graph are mapped to the plurality of links, and the links are weighted to be adjusted by ranking as applied to a specific subject.

8. The computer system of claim 7, further comprising:
  creating a graphic visualization of the knowledge graph, wherein the graphic visualization includes one or more portions of the knowledge graph and graphical notations associated with the knowledge graph; and
  displaying the graphic visualization of the knowledge graph on a device.

9. The computer system of claim 7, further comprising applying a rank to the subject based on the distinct characteristic of the displayed visual element.

10. The computer system of claim 7, wherein the distinct characteristic of the visual element is selected from a list consisting of: a color of the visual element, a proximity of the visual element to other visual elements in the image, an alignment of visual elements in the image and a determination that the visual element overlaps the other visual elements.

11. The computer system of claim 7, wherein the participant interaction movement of the visual element by the at least one session participant in the image is selected from a list consisting of: mouse movements of the at least one session participant in the collaboration session, mouse clicks of the at least one session participant in the collaboration session, physical movements of the visual element by the at least one session participant and a number of session participants that interact with the visual element in the image.

12. The computer system of claim 7, wherein a machine learning model that predicts a priority of the subject by detecting a participant sentiment in statements by the at least one session participants is used to update a weight for the link in the knowledge graph.

13. A computer program product for coordinating knowledge from visual elements in a collaboration session, the computer program product comprising:
  a computer-readable storage medium having program instructions embodied therewith, the program instructions executable by a processor to cause the processor to perform a method comprising:
  obtaining collaboration session data from the collaboration session and a profile of one or more session participants, wherein collaboration session include provisioning one or more resources as needed across a distributive computing system;
  determining one or more visual elements appearing in said collaboration session and at least one visual element being moved by at least one session participant during said collaboration session;
  determining when a collaboration session is currently in progress and obtaining additional information from the one or more session participants;
  identifying a subject and a link in an image of the at least one session participant and the visual element by recognizing text with the visual element;
  recognizing a distinct characteristic of a displayed visual element and a movement of the visual element by the session participant in the image of the session participant and the visual element;

obtaining subjects and links based on a context of the visual collaboration session as well as audio and video from the collaboration session from objects;

identifying the session participant in the image of the at least one session participant and the visual element and determining an expertise of the at least one session participant based on the profile of the session participant;

generating a knowledge graph using a knowledge coordination module to optimize resource use by leveraging metering capability appropriate to a type of service, wherein the knowledge graph comprises the subject as a node and the link as an edge and the link is weighted according to the distinct characteristic of the visual element and according to optimization of resources;

determining the movement of the visual element by the session participant, and the expertise of the session participant where the edges indicate a weight as to which edges are favored in traversing the knowledge graph to further update the knowledge graph; and said knowledge coordination module updates the knowledge graph by incorporating the level of expertise of participants and further parsing any text present in the visual elements including nouns and verbs to further modify the knowledge graph using recognition algorithms to enhance a plurality of links between subjects, and the edges in the knowledge graph, wherein one or more recognized subjects and the edges of the knowledge graph are mapped to the plurality of links, and the links are weighted to be adjusted by ranking as applied to a specific subject.

14. The computer program product of claim 13, further comprising:
creating a graphic visualization of the knowledge graph, wherein the graphic visualization includes one or more portions of the knowledge graph and graphical notations associated with the knowledge graph; and
displaying the graphic visualization of the knowledge graph on a device.

15. The computer program product of claim 13, further comprising applying a rank to the subject based on the distinct characteristic of the displayed visual element.

16. The computer program product of claim 13, wherein the distinct characteristic of the visual element is selected from a list consisting of: a color of the visual element, a proximity of the visual element to other visual elements the image, an alignment of visual elements in the image and a determination that the visual element overlaps the other visual elements.

17. The computer program product of claim 13, wherein the participant interaction movement of the visual element by the at least one session participant in the image is selected from a list consisting of: mouse movements of the at least one session participant in the collaboration session, mouse clicks of the at least one session participant in the collaboration session, physical movements of the visual element by the at least one session participant and a number of session participants that interact with the visual element in the image.

* * * * *